United States Patent
Shibata et al.

(10) Patent No.: US 7,556,755 B2
(45) Date of Patent: Jul. 7, 2009

(54) PROCESS FOR PRODUCING CERAMIC MOLDING HAVING THREE-DIMENSIONAL NETWORK STRUCTURE

(75) Inventors: Kazuo Shibata, Saitama (JP); Tadashi Ohya, Saitama (JP); Tsuyoshi Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 317 days.

(21) Appl. No.: 10/987,301

(22) Filed: Nov. 15, 2004

(65) Prior Publication Data

US 2005/0121816 A1  Jun. 9, 2005

(30) Foreign Application Priority Data

Nov. 20, 2003  (JP)  ............... 2003-390566

(51) Int. Cl.
*B29C 65/00* (2006.01)
*B28B 1/87* (2006.01)

(52) U.S. Cl. ....................... 264/44; 264/610
(58) Field of Classification Search ............... 264/44, 264/610
See application file for complete search history.

(56) References Cited

U.S. PATENT DOCUMENTS

| | | | | | |
|---|---|---|---|---|---|
| 4,775,598 | A | * | 10/1988 | Jaeckel ................. | 428/550 |
| 5,395,572 | A | * | 3/1995 | Brotz ..................... | 264/43 |
| 5,962,152 | A | * | 10/1999 | Nakamura et al. .... | 428/633 |
| 6,210,612 | B1 | * | 4/2001 | Pickrell et al. ........ | 264/44 |
| 6,235,665 | B1 | * | 5/2001 | Pickrell et al. ........ | 501/9 |
| 6,333,000 | B1 | * | 12/2001 | Garrigus ................ | 264/621 |
| 6,565,797 | B2 | * | 5/2003 | Miyakawa et al. .... | 264/628 |
| 6,592,787 | B2 | * | 7/2003 | Pickrell et al. ........ | 264/44 |
| 6,773,825 | B2 | * | 8/2004 | Pickrell et al. ........ | 428/566 |
| 6,849,213 | B2 | * | 2/2005 | Miyakawa et al. .... | 264/44 |
| 2003/0052428 | A1 | * | 3/2003 | Uemoto et al. ........ | 264/43 |

FOREIGN PATENT DOCUMENTS

| | | |
|---|---|---|
| DE | 1 197 010 | 7/1965 |
| DE | 1 278 322 | 9/1968 |
| JP | 5-50182 | 3/1993 |

* cited by examiner

*Primary Examiner*—Carlos Lopez
*Assistant Examiner*—Russell J Kemmerle, III
(74) *Attorney, Agent, or Firm*—Arent Fox LLP

(57) ABSTRACT

A process for producing a ceramic molding having a three-dimensional network structure with a plurality of spherical cells and a plurality of through holes present in dividing walls between the spherical cells, includes: a step of obtaining an aggregate of coated particles in which a plurality of ceramic particles are attached to the surface of spherical synthetic resin particles; a step of arranging the aggregate of coated particles in closest packed form within a mold; a step of filling gaps in the aggregate of coated particles with a ceramic so as to give a shaped product; a step of releasing the shaped product from the mold; a step of thermally decomposing the spherical synthetic resin particles of the shaped product so as to form the spherical cells and form the plurality of through holes in dividing wall-forming sections that are present between adjacent spherical cells; and a step of sintering the ceramic particles and the ceramic so as to form the dividing walls.

4 Claims, 6 Drawing Sheets

PROCESS FOR PRODUCING CERAMIC MOLDING HAVING THREE-DIMENSIONAL NETWORK STRUCTURE

BACKGROUND OF THE INVENTION

1. Field of the Invention

The present invention relates to a process for producing a ceramic molding having a three-dimensional network structure.

2. The Related Art

Conventionally, there is a known process for producing this type of ceramic molding, sequentially performing impregnation of a foam plastic with a ceramic slurry, drying of the ceramic slurry, thermal decomposition of the foam plastic, and sintering of ceramic particles (e.g., Japanese Patent Application Laid-open No. 5-50182).

However, since such a conventional ceramic molding has a nonuniform cell size and a nonuniform cell distribution, there is a problem as follows: when it is used as a reinforcing material for a metal matrix composite member, there is a possibility that there might be large differences in mechanical properties such as the strength and the sliding characteristics, physical properties such as the cooling performance and the coefficient of thermal expansion, etc. of the metal matrix composite member in some parts of the member.

SUMMARY OF THE INVENTION

Under the above-mentioned circumstances, it is an object of the present invention to provide a process for producing a ceramic molding that has improved uniformity in cell size and cell distribution.

In order to attain this object, in accordance with the present invention, there is provided a process for producing a ceramic molding having a three-dimensional network structure wherein, when producing a ceramic molding having a three-dimensional network structure with a plurality of spherical cells and a plurality of through holes present in dividing walls between adjacent spherical cells, the process includes a step of mixing an aggregate of spherical synthetic resin particles and an aggregate of ceramic particles having a diameter smaller than that of the spherical synthetic resin particles so as to obtain an aggregate of coated particles in which a plurality of the ceramic particles are attached to the surface of the spherical synthetic resin particles, a step of placing the aggregate of coated particles in a mold and carrying out a treatment so as to arrange the coated particles in closest packed form, a step of filling gaps in the aggregate of coated particles with a ceramic so as to give a shaped product, a step of releasing the shaped product from the mold, a step of thermally decomposing the spherical synthetic resin particles of the shaped product so as to form the spherical cells and form the plurality of through holes in dividing wall-forming sections that are present between adjacent spherical cells and that are formed from the plurality of ceramic particles and the ceramic, and a step of sintering the plurality of ceramic particles and the ceramic so as to form the dividing walls.

In accordance with the above-mentioned method, it is possible to obtain a ceramic molding having high uniformity in the size and distribution of the spherical cells. Furthermore, since the size of the spherical cells depends on the size of the spherical synthetic resin particles, it is easy to adjust the size of the spherical cells. This ceramic molding is therefore suitable as a reinforcing material for a metal matrix composite member.

The above-mentioned object, other objects, characteristics, and advantages of the present invention will become apparent from an explanation of preferred embodiments that will be described in detail below by reference to the attached drawings.

DESCRIPTION OF THE PREFERRED EMBODIMENTS

Figure 1:
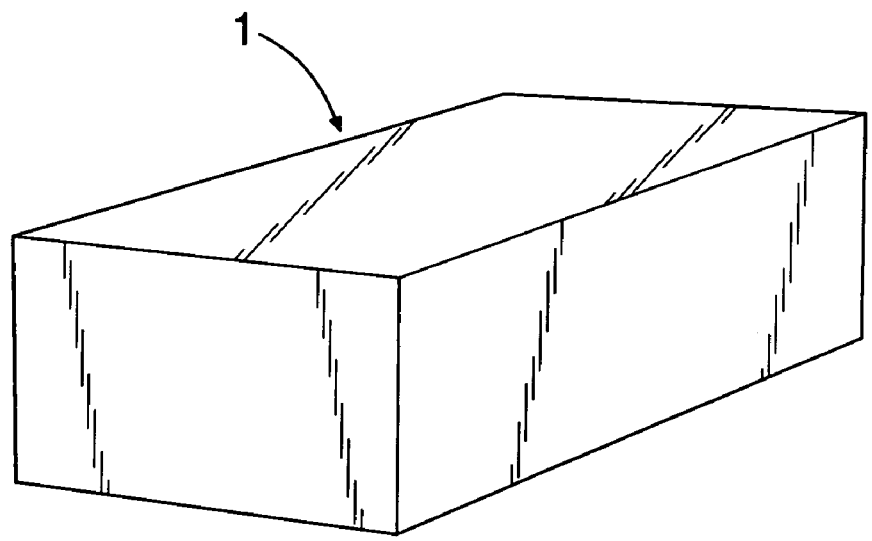
FIG. 1 is a perspective view of a metal matrix composite member.
Figure 2:
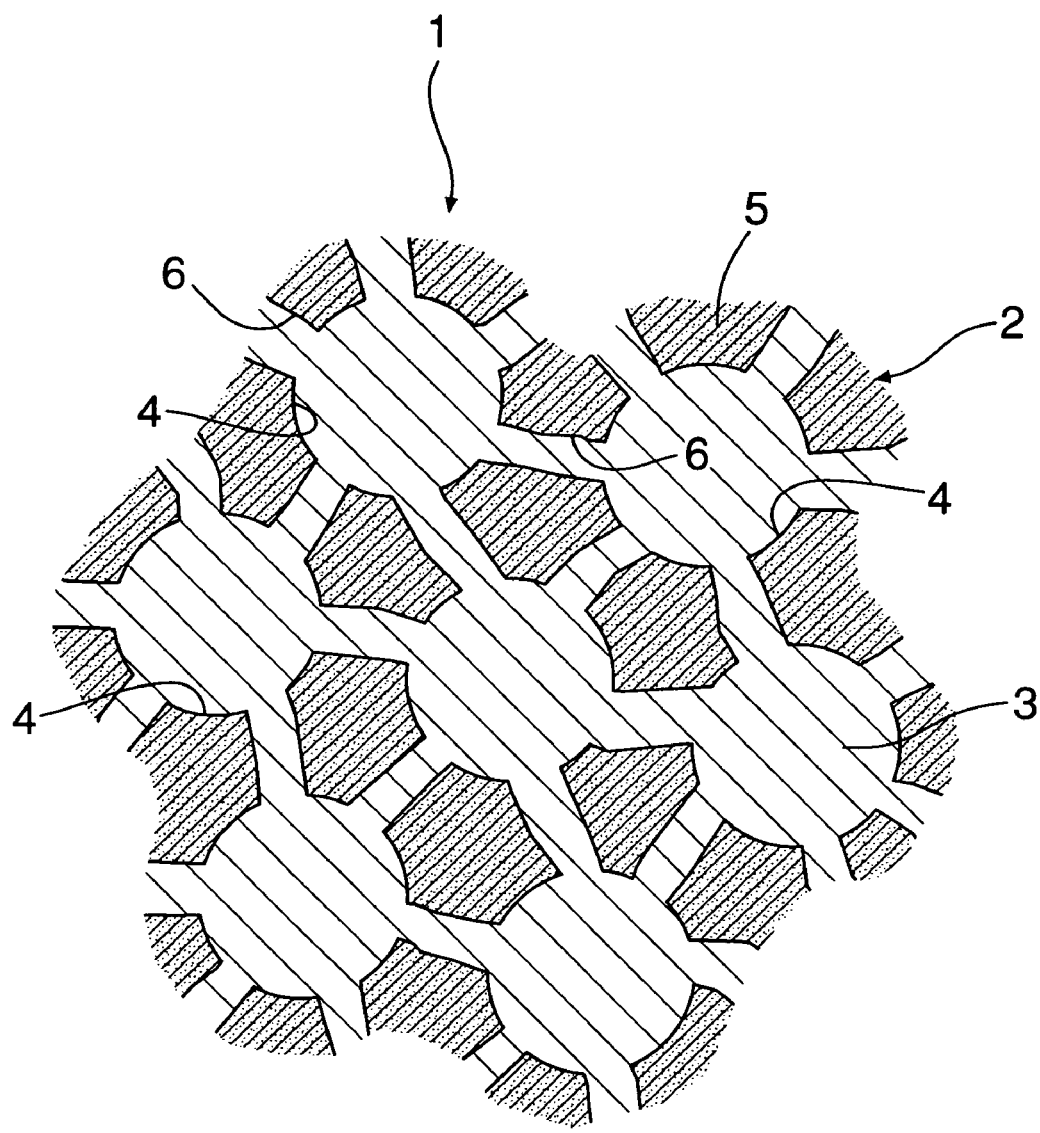
FIG. 2 is an enlarged sectional view of an essential part of the metal matrix composite member.
Figure 3:
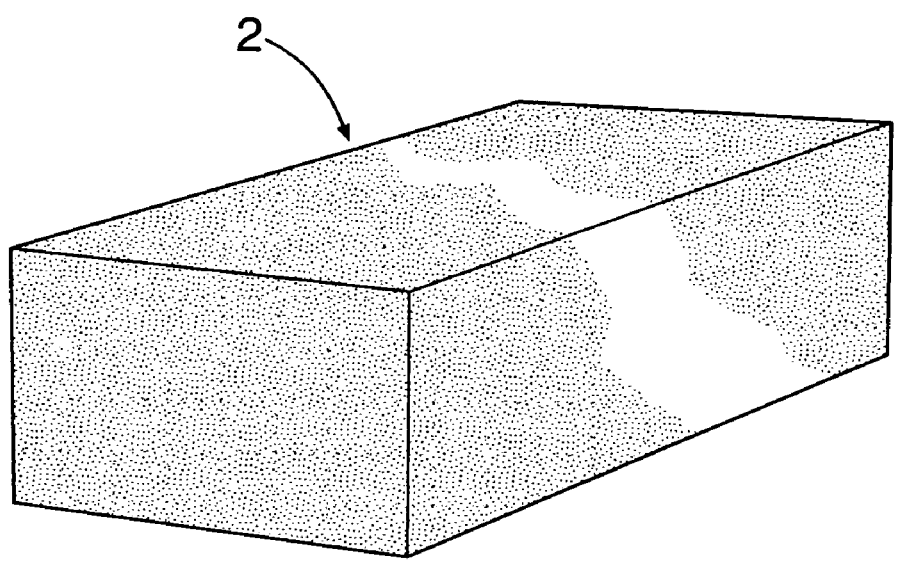
FIG. 3 is a perspective view of a ceramic molding.
Figure 4:
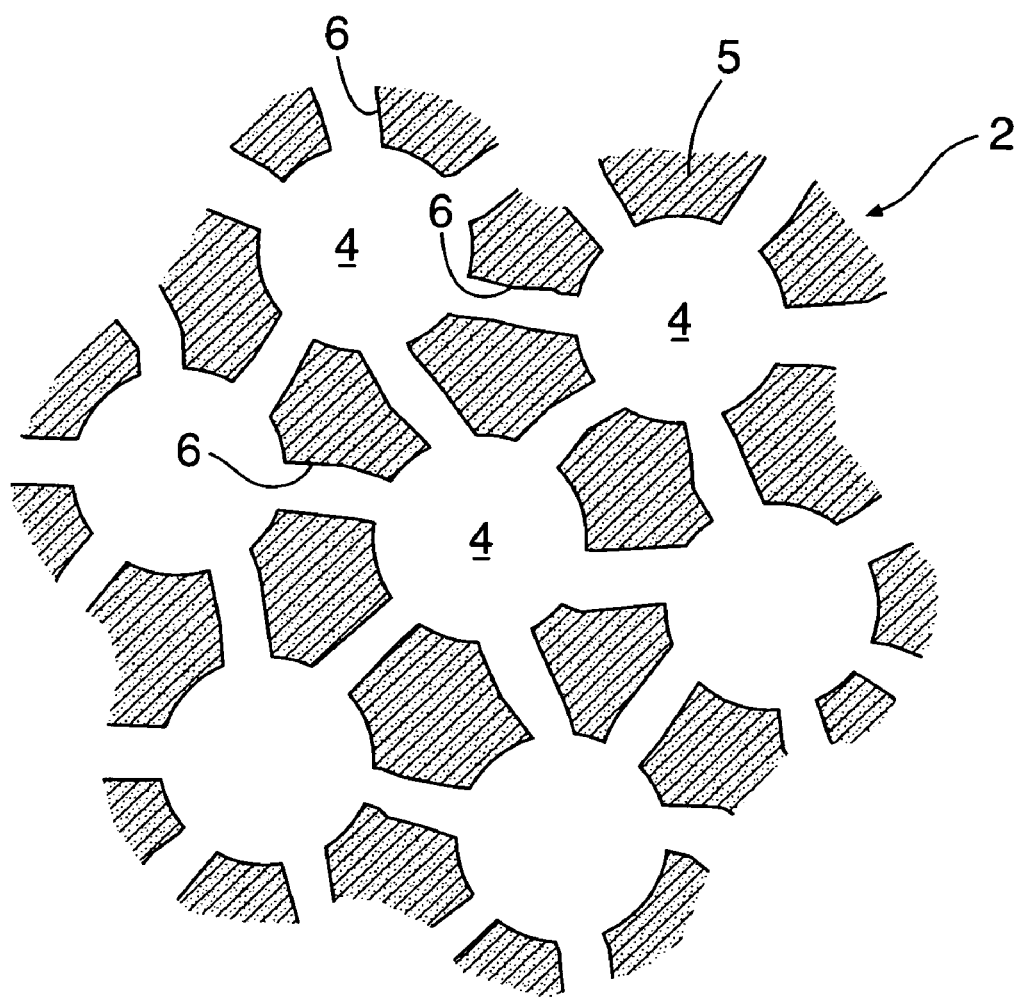
FIG. 4 is an enlarged sectional view of an essential part of the ceramic molding.

In FIGS. 1 and 2, a rectangular parallelepiped high strength metal matrix composite member 1 is formed from a ceramic molding 2 having a three-dimensional network structure and a metal matrix 3 with which the ceramic molding 2 is filled. In FIGS. 3 and 4, the ceramic molding 2 has a rectangular parallelepiped shape, and has a plurality of spherical cells 4 arranged in closest packed form and a plurality of through holes 6 present in dividing walls 5 between adjacent spherical cells 4.

The median $M_d$ of the inner diameter of the through hole 6 is set at $M_d \geq 1$ μm so as to allow pressure filling with a melt of the metal matrix 3. Furthermore, in order to ensure the strength of the ceramic molding 2, the ratio $Md/M_D$ between the median Md of the inner diameter of the through hole 6 and the median $M_D$ of the inner diameter of the spherical cell 4 is set at $0.1 < Md/M_D < 0.5$. When the ratio $Md/M_D$ is $\leq 0.1$, since stress is concentrated at the edge of the through hole 6, the strength of the member 1 is degraded, whereas when $Md/M_D \geq 0.5$, since the amount of dividing wall 5 decreases, the strength and rigidity of the member 1 are degraded. The median $M_D$ of the inner diameter of the spherical cell 4 is determined by 3D CT analysis, and the median Md of the inner diameter of the through hole 6 is determined by a mercury intrusion method.

As component materials of the ceramic molding 2, engineering ceramics such as SiC, $Al_2O_3$, $Si_3N_4$, and AlN are preferable, but they are not limited thereto. As component materials of the metal matrix 3, Al, an Al alloy, Si, an Si alloy, Cu, a Cu alloy, Mg, an Mg alloy, etc. are used.

Figure 5:
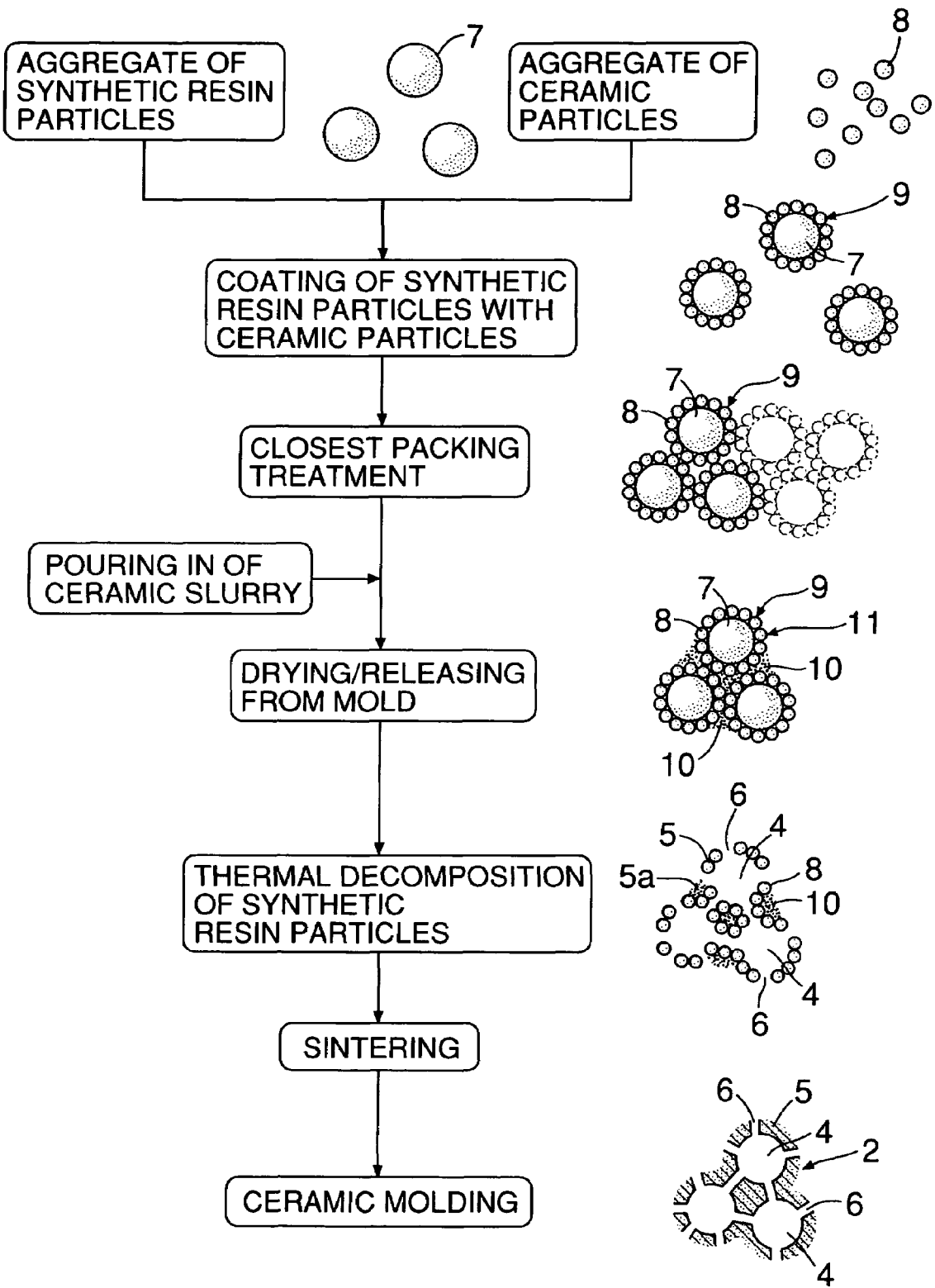
FIG. 5 is a diagram for explaining steps for producing the ceramic molding.

When producing the ceramic molding 2, steps shown in FIG. 5 are employed.

Step (a): An aggregate of spherical synthetic resin particles 7 for forming the spherical cells 4 and an aggregate of ceramic particles 8 having a diameter smaller than that of the synthetic resin particles 7 are prepared. As the spherical synthetic resin particles 7, those having a median diameter $D_M$ of, for example, $10\ \mu m \leq D_M \leq 1000\ \mu m$, are used, whereas as the ceramic particles 8, those having a median diameter $d_M$ of, for example, $0.1\ \mu m \leq d_M \leq 100\ \mu m$, are used. The ceramic particles 8 are the main component material of the ceramic molding 2, and the material is as described above. As the spherical synthetic resin particles 7, PMMA (polymethyl methacrylate) particles, PS (polystyrene) particles, etc. are used. In this case, it is also possible to use C (carbon) particles.

Step (b): The two aggregates are charged into a coating processor to obtain an aggregate of coated particles 9 in which the ceramic particles 8 are attached densely to the surface of the synthetic resin particles 7. Appropriate mixing ratio by weight between the aggregate of synthetic resin particles 7 and the aggregate of ceramic particles 8 is $0.1 \leq W_1/W_2 \leq 10$, where the weight of the aggregate of synthetic resin particles 7 is $W_1$ and the weight of the aggregate of ceramic particles 8 is $W_2$. When $W_1/W_2 > 10$, since the amount of ceramic particles is insufficient relative to the amount of synthetic resin, the whole surface of the synthetic resin particles 7 cannot be covered with the ceramic particles 8, whereas when $W_1/W_2 < 0.1$, since the amount of ceramic particles is too great relative to the amount of synthetic resin, there is a large amount of residual ceramic particles 8 not covering the surface of the resin. As the coating processor, an AM-15F manufactured by Hosokawa Micron Corporation (ref. Japanese Patent Application Laid-open No. 2003-160330) is used, its rotational speed RS is set at $500 \text{ rpm} \leq RS \leq 2500 \text{ rpm}$, the treatment time t is set at $0.25 \text{ h} \leq t \leq 1 \text{ h}$, and the inner piece distance is adjusted to 1 mm.

Step (c): The aggregate of coated particles 9 is placed in a mold and subjected to a closest packing treatment. This treatment employs a vacuum filtration method using a porous mold such as gypsum, a mold made of various types of metal or PTFE and having a plurality of suction holes in the base, etc. In this case, means of pressurizing the interior of the mold from the opening side may be used as necessary.

Step (d): A ceramic slurry containing, for example, a ceramic 10 of the same material as the ceramic particles 8 is poured into the mold so as to fill the gaps in the aggregate. The ceramic slurry is formed from ceramic particles, a deflocculant, a binder, and distilled water. As the deflocculant, a quaternary ammonium salt, an acrylic acid oligomer, monoethylamine, etc. is used. As the binder, polyvinyl alcohol, an acrylic emulsion, polyvinyl butyral, methyl cellulose, β-1,3 glucan, etc. is used. When preparing the ceramic slurry, a method is employed in which a mixture containing the binder and distilled water is prepared, and this mixture, the ceramic particles, the deflocculant, and distilled water are then mixed well using a ball mill, followed by vacuum degassing. Appropriate viscosity η of the ceramic slurry is $0.05 \text{ Pa·s} \leq \eta \leq 5 \text{ Pa·s}$. When $\eta < 0.05$ Pa·s, since the amount of water is excessive, there is a large amount of deformation and shrinkage of the ceramic after drying and calcining, whereas when $\eta > 5$ Pa·s, since the viscosity of the slurry is too high, it becomes impossible to make the slurry penetrate sufficiently into the gaps in the aggregate.

Step (e): After the ceramic slurry is dried, a shaped product 11 formed from the ceramic 10 and the coated particles 9 is removed from the mold. When drying, a primary drying treatment in which $10° \text{ C.} \leq T \leq 30° \text{ C.}$ and $5 \text{ h} \leq t \leq 40 \text{ h}$, and a secondary drying treatment in which $30° \text{ C.} \leq T \leq 120° \text{ C.}$ and $1 \text{ h} \leq t \leq 20 \text{ h}$ are employed, where T is the heating temperature and t is the heating time.

Step (f): The shaped product 11 is placed within a sintering furnace under a predetermined atmosphere, then the temperature within the furnace is increased at a predetermined rate of temperature increase under a predetermined pressure within the furnace to a heating temperature at which the synthetic resin particles 7 can be thermally decomposed, and this heating temperature is maintained for a predetermined period of time. During this process, the synthetic resin particles 7 thermally decompose to form the spherical cells 4, and the pressure generated by escape of the thermal decomposition gas forms a plurality of through holes 6 in dividing wall-forming sections 5a that are present between adjacent spherical cells 4 and that are formed from the plurality of ceramic particles 8 and the ceramic 10. The atmosphere within the furnace is air or an inert gas such as nitrogen or Ar. Although it depends on the material of the synthetic resin particles 7, the pressure P within the furnace is generally set at $0.01 \text{ MPa} \leq P \leq 1 \text{ MPa}$, the rate of temperature increase Hr is set at $5° \text{ C./h} \leq Hr \leq 120° \text{ C./h}$, the heating temperature T is set at $300° \text{ C.} \leq T \leq 600° \text{ C.}$, and the heating time t is set at $0.5 \text{ h} \leq t \leq 10 \text{ h}$. With regard to the atmosphere within the furnace, at a given rate of temperature increase, compared with an atmosphere of air, an atmosphere of nitrogen gas tends to slow the loss of the aggregate of synthetic resin particles, that is, slow the thermal decomposition. When the pressure within the furnace P is $<0.01$ MPa, since the pressure of the gas generated by thermal decomposition of the synthetic resin particles (C particles) or the binder is high, the shaped product might deform or break, whereas when $P > 1$ MPa, since the pressure of the gas generated is low, sufficient through holes cannot be obtained. When the rate of temperature increase Hr is $<5°$ C./h, since the pressure of the generated gas is low, sufficient through holes cannot be obtained, whereas when $Hr > 120°$ C./h, since the pressure of the generated gas is high, the shaped product might deform or break. Furthermore, when the heating temperature T is $<300°$ C., the synthetic resin particles, the binder, etc. cannot be sufficiently vaporized and they remain in the shaped product, whereas when $T > 600°$ C., the vicinity of the surface of the shaped product is gradually affected by the atmosphere. When the heating time t is $<0.5$ h, the synthetic resin particles or the binder might remain in some cases, whereas when $t > 10$ h, the vicinity of the surface of the shaped product is gradually affected by the atmosphere.

Step (g): the temperature of the interior of the furnace is increased to a temperature at which sintering of the ceramic particles 8 is possible, and this sintering temperature is maintained for a predetermined period of time. By so doing, the ceramic molding 2 having a three-dimensional network structure is obtained. Although it depends on the material of the ceramic particles 8, the sintering temperature T is generally set at $1000° \text{ C.} \leq T \leq 2300° \text{ C.}$ and the sintering time t is set at $2 \text{ h} \leq t \leq 6 \text{ h}$. When the sintering temperature T is $<1000°$ C., sintering is insufficient, whereas when $T \geq 2300°$ C., the ceramic starts to sublime. Furthermore, when the sintering time t is $<2$ h, sintering is insufficient, whereas when $t=6$ h, since sintering of the ceramic is carried out sufficiently, it is unnecessary to increase the sintering time any longer. While taking into consideration the cost, improvement in the lifetime of the furnace, etc., the sintering temperature can be decreased by employing means such as use of a sintering adjuvant or pressurizing the atmosphere.

In the above-mentioned production process, the inner diameter of the spherical cells 4 and the uniformity of the inner diameter depend on the median diameter $D_M$ of the synthetic resin particles 7, and a uniform distribution of the spherical cells 4 can be achieved by carrying out the closest packing treatment of step (c). Furthermore, the inner diameter of the through holes 6 is controlled by the atmosphere within the furnace, the rate of temperature increase, the pressure within the furnace, the viscosity of the ceramic slurry (concentration of the ceramic 10), etc. in step (f). For example, by setting the median diameter $D_M$ of the synthetic resin particles 7 at a predetermined value and controlling the rate of temperature increase Hr, it is possible to obtain the ratio $Md/M_D$ between the two medians Md and $M_D$ within $0.1 \leq Md/M_D < 0.5$.

Figure 6:
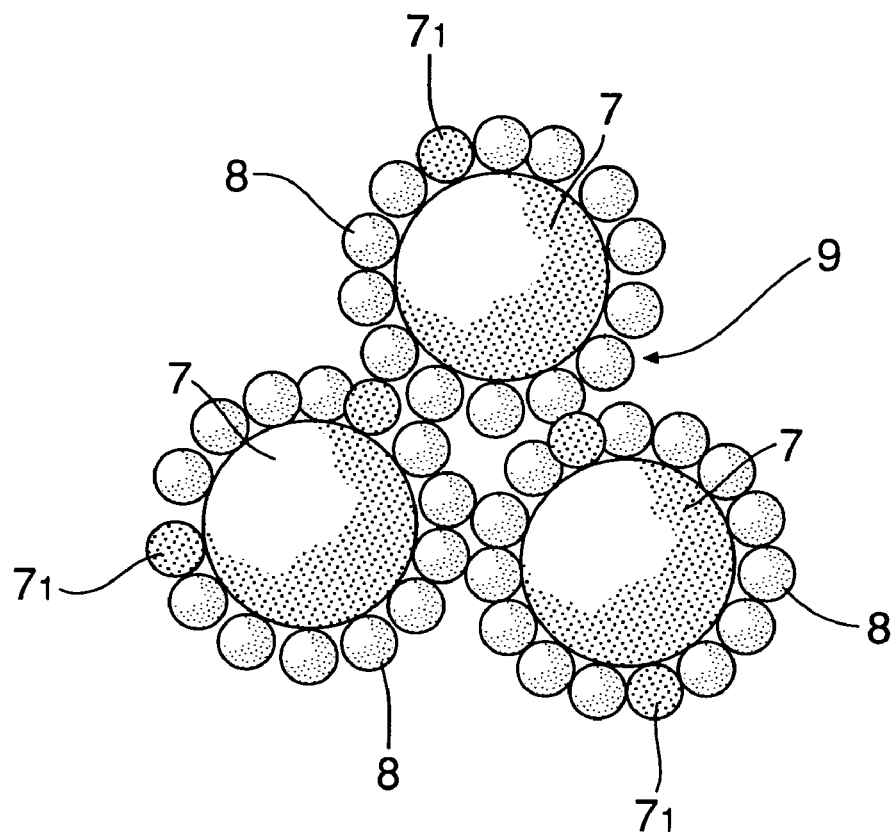
FIG. 6 is a diagram for explaining another example of coated particles.

As shown in FIG. 6, with regard to the coated particles 9, means can be employed in which some of the ceramic particles 8 are replaced by small diameter synthetic resin particles $7_1$, and formation of the through holes 6 is promoted by thermal decomposition of the small diameter synthetic resin particles $7_1$, thus controlling the median Md of the inner diameter of the through holes 6.

Specific examples are explained below.

Embodiment 1

The steps (a) to (g) were carried out under the conditions below, to obtain a rectangular parallelepiped ceramic molding having a height of 20 mm, a width of 30 mm, and a length of 40 mm.

Step (a) ... Aggregate of spherical synthetic resin particles: an aggregate of PMMA particles having a median diameter $D_M$ of 90 μm (product name MR-90G, manufactured by Soken Kagaku K.K.); aggregate of ceramic particles: an aggregate of SiC particles having a median diameter $d_M$ of 0.5 μm (product name OY-20, manufactured by Yakushima Denko Co., Ltd.).

Step (b) ... Mixing ratio by weight between an aggregate of synthetic resin particles ($W_1$) and an aggregate of ceramic particles ($W_2$): $W_1/W_2=1/1$; coating processor: product name AM-15F, manufactured by Hosokawa Micron Corporation, rotational speed RS 1000 rpm, treatment time t 0.5 h, inner piece distance 1 mm.

Step (c): Dimensions and structure of mold: two PTFE blocks having a 20 mm high, 30 mm wide, and 20 mm deep indentation were arranged so as to face each other, thus giving a mold having a 20 mm high, 30 mm wide, and 40 mm long cavity; closest packing treatment involving vacuum filtration: a glass fiber filter material having 0.7 μm through holes was placed on the base of one of the blocks, which had a plurality of suction holes, the cavity was subsequently charged with the coated particles via an opening of the other block, and the interior of the cavity was then evacuated via the suction holes of said one block.

Step (d) ... Ceramic slurry: SiC slurry; composition: an aggregate of SiC particles (α-SiC, median diameter 0.5 μm) 61.7 mass %, 20% quaternary ammonium salt 2.8 mass %, 35% acrylic emulsion 1.9 mass %, distilled water 33.6 mass %; viscosity η0.32 Pa·s.

Step (e) ... Primary drying treatment: heating temperature T 20° C., heating time t 20 h; secondary drying treatment: heating temperature T 90° C., heating time t 1 h.

Step (f) ... Atmosphere within the furnace: air; pressure P within the furnace: 0.1 MPa; rate of temperature increase Hr: 10° C./h; heating temperature T: 500° C., heating time t: 1 h.

Step (g) ... Sintering temperature T: 2000° C.; sintering time t: 3 h.

A ceramic molding 2 thus obtained had a three-dimensional network structure, the plurality of spherical cells 4 were arranged in closest packed form, the median $M_D$ of the inner diameter thereof was 80 μm, the median Md of the inner diameter of the through holes 6 was 16 μm, and thus the ratio Md/$M_D$ between the two medians Md and $M_D$ was 0.2.

Embodiment 2

The steps (a) to (g) were carried out under the conditions below, to obtain a rectangular parallelepiped ceramic molding having a height of 20 mm, a width of 30 mm, and a length of 40 mm.

Step (a) ... Aggregate of spherical synthetic resin particles: an aggregate of PMMA particles having a median diameter $D_M$ of 10 μm (product name MX-1000, manufactured by Soken Kagaku K.K.); aggregate of ceramic particles: an aggregate of $SiO_2$ particles having a median diameter $d_M$ of 0.01 μm (product name S-5280, manufactured by SIGMA), and an aggregate of $Al_2O_3$ particles having a median diameter $d_M$ of 0.28 μm (product name Taimicron TM-D, manufactured by Taimei Chemicals Co., Ltd.), $SiO_2/Al_2O_3$ mixing ratio by weight between the aggregate of $SiO_2$ particles and the aggregate of $Al_2O_3$ particles=1/20.

Step (b) ... Mixing ratio by weight between an aggregate of synthetic resin particles ($W_1$) and an aggregate of ceramic particles ($W_2$): $W_1/W_2=1/1$; coating processor: product name AM-15F, manufactured by Hosokawa Micron Corporation, rotational speed RS 1000 rpm, treatment time t 0.5 h, inner piece distance 1 mm.

Step (c): Dimensions and structure of mold: two PTFE blocks having a 20 mm high, 30 mm wide, and 20 mm deep indentation were arranged so as to face each other, thus giving a mold having a 20 mm high, 30 mm wide, and 40 mm long cavity; closest packing treatment involving vacuum filtration: a glass fiber filter material having 0.7 μm through holes was placed on the base of one of the blocks, which had a plurality of suction holes, the cavity was subsequently charged with the coated particles via an opening of the other block, and the interior of the cavity was then evacuated via the suction holes of said one block.

Step (d) ... Ceramic slurry: $Al_2O_3$ slurry; composition: an aggregate of $Al_2O_3$ particles (median diameter 0.28 μm) 40.6 mass %, ammonium polycarboxylate 1.3 mass %, acrylic emulsion 1.9 mass %, distilled water 56.2 mass %; viscosity η0.43 Pa·s.

Step (e) ... Primary drying treatment: heating temperature T 20° C., heating time t 20 h; secondary drying treatment: heating temperature T 90° C., heating time t 1 h.

Step (f) ... Atmosphere within the furnace: air; pressure P within the furnace: 0.1 MPa; rate of temperature increase Hr: 10° C./h; heating temperature T: 500° C., heating time t: 1 h.

Step (g) ... Sintering temperature T: 1600° C.; sintering time t: 3 h.

A ceramic molding 2 thus obtained had a three-dimensional network structure, the plurality of spherical cells 4 were arranged in closest packed form, the median $M_D$ of the inner diameter thereof was 10 μm, the median Md of the inner diameter of the through holes 6 was 2 μm, and thus the ratio Md/$M_D$ between the two medians Md and $M_D$ was 0.2.

As the metal matrix composite member, there can be cited as examples an engine cylinder block in which at least one position selected from among the area around a cylinder bore, a cylinder head gasket face, a bolt tightening seat face, the area around a journal bearing, etc. is reinforced, an cylinder head in which at least one position selected from among a cylinder head gasket face, a bolt tightening seat face, the area around a cam journal bearing, a valve seat press-fit portion, a valve guide press-fit portion, etc. is reinforced, and a case or a cover in which at least one position selected from among a bolt tightening seat face, a mating face, etc. is reinforced.

Although embodiments of the present invention are explained in detail above, the present invention can be modified in a variety of ways without departing from the subject matter of the present invention.

What is claimed is:

1. A process for producing a ceramic molding having a three-dimensional network structure with a plurality of spherical cells and a plurality of through holes present in dividing walls between adjacent spherical cells, the process comprising:

a step of dry mixing an aggregate of spherical synthetic resin particles and an aggregate of ceramic particles having a diameter smaller than that of the spherical synthetic resin particles so as to obtain an aggregate of coated particles free of liquid and in which a plurality of the ceramic particles are attached to the surface of the spherical synthetic resin particles;

a step of placing the aggregate of coated particles in a mold and performing a vacuum filtration process to arrange the coated particles in closest packed form;

a step of filling gaps in the aggregate of coated particles with a ceramic so as to give a shaped product;

a step of releasing the shaped product from the mold;

a step of thermally decomposing the spherical synthetic resin particles of the shaped product so as to form the spherical cells and form the plurality of through holes in dividing wall-forming sections that are present between adjacent spherical cells and that are formed from the plurality of ceramic particles and the ceramic; and a step of sintering the plurality of ceramic particles and the ceramic so as to form the dividing walls.

2. The process according to claim 1, wherein a mixing ratio by weight between the aggregate of synthetic resin particles and the aggregate of ceramic particles is set to be $0.1 \leq W_1/W_2 \leq 10$, wherein the weight of the aggregate of synthetic resin particles is $W_1$ and the weight of the aggregate of ceramic particles is $W_2$.

3. The process according to claim 1, wherein a ratio $Md/M_D$ between a median Md of an inner diameter of the through hole and a median $M_D$ of an inner diameter of the spherical cell is set at $0.1 < Md/M_D < 0.5$.

4. The process according to claim 2, wherein a ratio $Md/M_D$ between a median Md of an inner diameter of the through hole and a median $M_D$ of an inner diameter of the spherical cell is set at $0.1 < Md/M_D < 0.5$.

* * * * *